United States Patent [19]

Lippert

[11] Patent Number: 4,861,545
[45] Date of Patent: Aug. 29, 1989

[54] NUCLEAR REACTOR FUEL ASSEMBLY

[75] Inventor: Hans-Joachim Lippert, Höchstadt, Fed. Rep. of Germany

[73] Assignee: Siemens Aktiengesellschaft, Berlin and Munich, Fed. Rep. of Germany

[21] Appl. No.: 120,725

[22] Filed: Nov. 13, 1987

Related U.S. Application Data

[63] Continuation of Ser. No. 672,793, Nov. 19, 1984, abandoned.

[30] Foreign Application Priority Data

Nov. 21, 1983 [DE] Fed. Rep. of Germany ....... 3341966

[51] Int. Cl.⁴ ............................................... G21C 3/32
[52] U.S. Cl. .................................... 376/448; 376/434; 376/446
[58] Field of Search ............... 376/178, 434, 362, 363, 376/364, 446, 448

[56] References Cited

U.S. PATENT DOCUMENTS

| | | | |
|---|---|---|---|
| 3,338,791 | 8/1967 | Lass et al. | 376/448 |
| 3,364,122 | 1/1968 | Mombazet et al. | 376/362 |
| 3,878,042 | 4/1975 | Curulla et al. | 376/446 |
| 3,968,008 | 7/1976 | Piepers et al. | 376/446 |
| 4,119,489 | 10/1978 | Itoh et al. | 376/446 |
| 4,304,635 | 12/1981 | Lippert et al. | 376/448 |
| 4,448,744 | 5/1984 | Karger et al. | 376/448 |

FOREIGN PATENT DOCUMENTS 1429235 3/1976 United Kingdom .

Primary Examiner—Deborah L. Kyle
Assistant Examiner—Richard W. Wendtland
Attorney, Agent, or Firm—Herbert L. Lerner; Laurence A. Greenberg

[57] ABSTRACT

A nuclear reactor fuel assembly having fuel rods containing nuclear fuel, includes a fuel assembly box in which the fuel rods are disposed, a head plate in the box having feedthroughs formed therein in which fuel rods are guided, at least some of the fuel rods being fastened to the head plate in the feedthroughs, a corner bolt disposed on top of the head plate, a cross piece disposed on the corner bolt at an upper inside corner of the box, an angular part disposed on two outer surfaces of the box, two leaf springs each extended in longitudinal direction of the box on a respective one of the two outer surfaces, a screw bolt connecting the box and the angular part to the corner bolt, the screw bolt having an expansion shank formed therein with a reduced diameter at the corner bolt, the screw bolt having a screw head with two ends, the screw head having a constriction formed therein between the ends thereof defining a coaxial screw head shank with a reduced diameter disposed in a hole formed in the angular part, and a holding body in the form of a transverse pin fastened to the angular part in the hole and engaging the screw bolt at the constriction for connecting the screw bolt to the top of the angular part.

3 Claims, 2 Drawing Sheets

NUCLEAR REACTOR FUEL ASSEMBLY

This application is a continuation of application Ser. No. 672,793, filed Nov. 19, 1984, now abandoned.

BACKGROUND OF THE INVENTION

1. Field of the Invention

The invention relates to a nuclear reactor fuel assembly with fuel rods which contain nuclear fuel, the fuel rods being guided in feedthroughs formed in a head plate, and at least part of the fuel rods being fastened in the feedthroughs, a fuel assembly box in which the fuel rods are disposed, the box having a cross piece located inside an upper corner with which it rests on a corner bolt located on the upper surface of the head plate, the box and an angular part being bolted to the corner bolt with a screw bolt, the angular part being fitted to the fuel assembly box on the outside of two sides of the fuel assembly box and the angular part having leaf springs extending in the longitudinal direction on each of the two sides of the box, the screw bolt having an expansion shank with a reduced diameter, the screw bolt being captively associated with the angular part by means of a screw head on the top of the angular part, and a mounting body.

2. Description of the Related Art

Such a nuclear reactor fuel assembly is known from German Published, Non-Prosecuted Application DE-OS No. 28 2.4 265, corresponding to U.S. Pat. No. 4,304,635. The mounting body in that device is located on the underside of the angular part of this prior art nuclear reactor fuel assembly and is a cylindrical pin disposed in a transverse hole formed in a threaded bolt which is secured against falling out of the transverse hole by a welded spot on the threaded bolt.

The cross section of the threaded bolt is reduced at the location of the transverse hole. Furthermore, the material of which the threaded bolt is made is sensitized at that location by a welded spot. Therefore, it is possible for the threaded bolt to break not at the expansion shank which has a reduced diameter and which is provided for this purpose, but rather at the transverse hole. This can occur, for instance, if expansion forces act on the threaded bolt in the longitudinal direction, while inserting the nuclear reactor fuel assembly into a boiling-water nuclear reactor.

It is accordingly an object of the invention to provide a nuclear reactor fuel assembly which overcomes the hereinafore-mentioned disadvantages of the heretofore-known devices of this general type, and to ensure that the threaded bolt always breaks at the expansion shank which has a reduced diameter and which is provided for this purpose, if the expansion forces are excessive, and that it breaks nowhere else.

SUMMARY OF THE INVENTION

With the foregoing and other objects in view there is provided, in accordance with the invention, a nuclear reactor fuel assembly having fuel rods containing nuclear fuel, comprising a fuel assembly box in which the fuel rods are disposed, a head plate in the box having feedthroughs formed therein in which fuel rods are guided, at least some of the fuel rods being fastened to the head plate in the feedthroughs, a corner bolt disposed on top of the head plate, a cross piece disposed on the corner bolt at an upper inside corner of the box, an angular part disposed on two outer surfaces of the box, two leaf springs each extended in longitudinal direction of the box on a respective one of the two outer surfaces, a screw bolt connecting the box and the angular part to the corner bolt, the screw bolt having an expansion shank formed therein with a reduced diameter at the corner bolt, the screw bolt having a screw head with two ends, the screw head having a constriction formed therein between the ends thereof defining a coaxial screw head shank with a reduced diameter disposed in a hole formed in the angular part, and a holding body in the form of a transverse pin fastened to the angular part in the hole and engaging the screw bolt at the constriction for undetachably connecting the screw bolt to the top of the angular part.

In this manner it is ensured that the threaded bolt breaks only at the expansion shank if the expansion forces in the threaded bolt become too large, while the constriction of the screw head, i.e. the screw head shank which has a reduced diameter, is not stressed at all by these expansion forces. The transverse pin thus prevents fragments of the threaded bolt from separating from the nuclear reactor fuel assembly if the expansion shank breaks.

Therefore, fragments of the spring ring cannot separate from the nuclear reactor fuel assembly, whether the expansion shank of the threaded bolt breaks or the spring ring breaks. Nevertheless, however, the screw bolt can rotate about its longitudinal axis.

Published, Non-Prosecuted Application DE-OS No. 24 30 642, corresponding to British Patent GB-PS No. 1,429,235, describes a housing base of a watthour meter with a housing cover which is bolted to the housing base with a screw bolt. While this screw bolt has a weakened point at which the screw bolt is supposed to break in the event of mechanical stresses and has a notch separated from this weakened point with which a holding washer braced against the housing cover engages, this notch is not located between the two ends of the screw head, but rather exactly at the weakened point in the shank of the screw bolt formed at the lower end of the screw head. The lower end of the screw head is of necessity determined by its support point at the housing cover. Mechanical stresses therefore can also lead to a situation wherein the shank does not break at the weak point provided for this purpose but at the notch, so that the screw head and the holding washer are no longer secured against falling out of the housing cover.

In accordance with a concomitant feature of the invention, there is provided a spring ring partially disposed in a countersink formed in the angular part and partially disposed between the screw head and the angular part.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
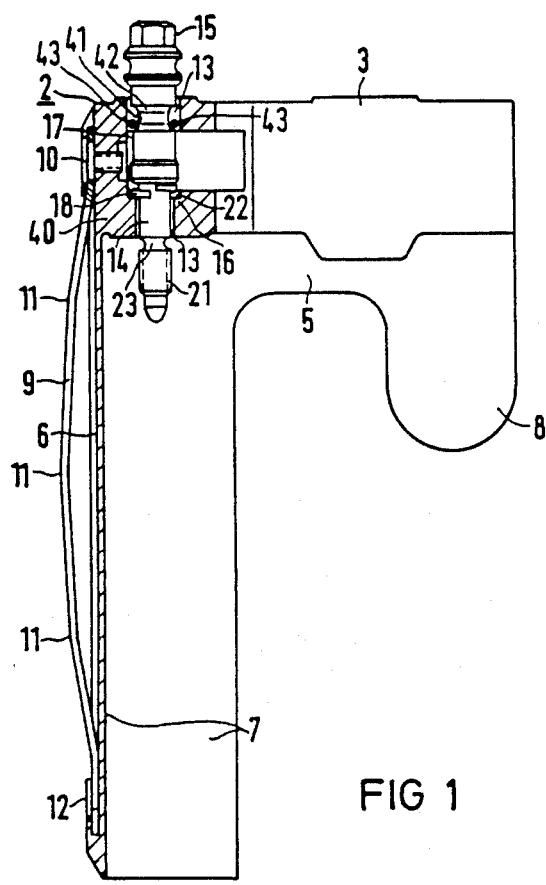
FIG. 1 is a diagrammatic, longitudinal-sectional view of an angular part for a nuclear reactor fuel assembly according to the invention, taken along the dot-dash line I—I in FIG. 2, in the direction of the arrows.
Figure 2:
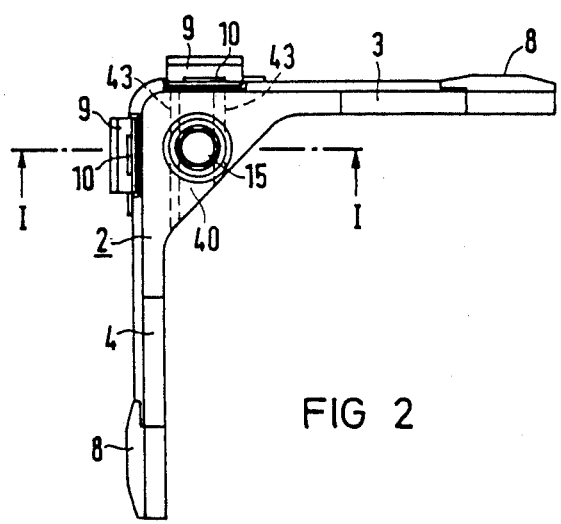
FIG. 2 is a top-plan view of the angular part according to FIG. 1.

Referring now to the figures of the drawings in detail, and first particularly to FIGS. 1 and 2 thereof, there is seen an angular part 2 having two legs 3 and 4 of equal length which are at right angles to each other. Walls 5, 6 are disposed on the same side of the legs 3 and 4. The walls 5 and 6 are disposed at right angles in an apex piece 40 of the legs 3 and 4, relative to each other and relative to the apex piece 40. In the apex piece 40, the walls 5 and 6 form an elongated L-shaped profile 7 which is at right angles to the legs 3 and 4, while at the ends of the legs 3 and 4, the walls 5 and 6 are formed into a rigid detent bump 8 which rises toward the outside.

An elongated leaf spring 9 is disposed on each of the walls 5 and 6, on the outside at the L-shaped profile 7, along the direction of the L-shaped profile 7. One end of each of the springs 9 is fastened by a screw 10 to the angular part 2 at the upper end of the L-shaped profile 7. The other end of each leaf spring 9 is guided in a freely sliding manner in a gate 12 on the outside of the lower end of the L-shaped profile 7. The leaf springs 9 are bent in three transverse lines 11 in such a manner that the leaf springs 9 are curved outward away from the outside of the L-shaped profile 7. The apex piece 40 of the legs 3 and 4 also has a hole 13 formed therein which extends at right angles to the two legs 3 and 4, i.e. parallel to the walls 5 and 6. A screw bolt 14 is disposed in the hole 13 and is movable and rotatable about its longitudinal axis. The screw bolt 14 has a smaller diameter below the angular part 2 than on the top of the angular part 2 and thereby forms a shoulder 16. One end of the screw bolt 14 on top of the angular part 2 has a head 15 which has a larger diameter than the hole 13 at the shoulder 16. The head 15 is associated with the shoulder 16 in the feedthrough or hole 13 for support. A spring ring 18 is also loosely disposed on the screw bolt 14 between the screw head 15 and the shoulder 16 in the hole 13 of the angular part 2. The spring ring 18 is resilient in the longitudinal direction of the screw bolt 14 and a countersink 22 is provided in the angular part above the shoulder 16 for the spring ring 18.

The other end of the screw bolt 14 itself is provided with a thread 21 under the angular part 2. Between the thread 21 and the screw head 15 there is an expansion shank 23 with a reduced diameter. The thread 21 of the screw bolt 14 can be screwed to a corner bolt on the top of the head plate of a nuclear reactor fuel assembly according to FIG. 3. The screw head 15 has a constriction 41 between its two ends which is formed by a coaxial screw head shank 42 with a reduced diameter. The constriction 41 is located in the feedthrough 13 on the top of he angular part 2. Two mutually parallel transverse pins 43 are guided at a distance from each other and fastened in the angular part 2. The pins also extend transversely through the hole 13 on the top of the angular part 2 and are in a common plane which is at right angles to the longitudinal axis of the screw bolt 14. On one hand, the screw head shank 42 is located between the two transverse pins 43 forming a holding body; on the other hand, these transverse pins 43 are located between the two ends of the screw head 15 at the constriction 41 formed therein. In the constriction 41, the pins 43 act as holding bodies for the screw bolt 14 and prevent the screw head 15 from sliding out of the hole 13 in the direction of its longitudinal axis toward the top of the angular part 2, by forming a stop for the end of the screw head 15 with the screw bolt 14 at the underside of the angular part 2. Naturally, one pin 43 is sufficient to form a holding body for the screw bolt. However, the screw head shank 42 is also long enough to permit the two transverse pins 43 to leave enough play for the screw head 15, so that it can rest with one end flush against the shoulder 16 with the spring ring 18 pushed in, if the other end of the screw head 15 has a diameter larger than that of the screw head shank 42.

Figure 3:
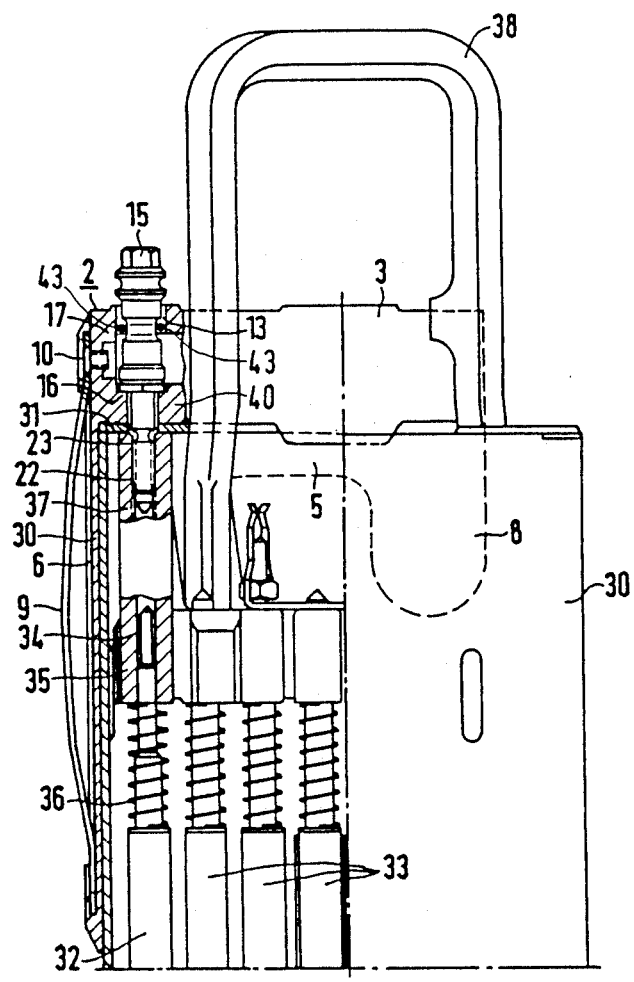
FIG. 3 is a partially longitudinal-sectional view of the upper part of a nuclear reactor fuel assembly according to the invention, which is partially broken away.

As is shown in FIG. 3, wherein like parts are provided with the same reference symbols as in FIGS. 1 and 2, the nuclear reactor fuel assembly for a boiling-water nuclear reactor has an elongated, square fuel assembly box 30. The inside corner of the upper end of the box 30 is provided with a cross piece 31. Fuel rods 32 and 33 filled with nuclear fuel are disposed side by side inside the fuel assembly box 30 with longitudinal axes parallel to the longitudinal direction of the fuel assembly box 30. The upper ends of the fuel rods 32 which are adjacent the inside of the fuel assembly box 30, are brought through feedthroughs 34 in a head plate 35 within the fuel assembly box 30 and are bolted in these feedthroughs 34. The upper ends of the other fuel rods 33 filled with nuclear fuel are only loosely guided in feedthroughs in the head plate 35. All of the fuel rods 32 and 33 are braced against the head plate 35 by coil springs 36. In the same manner, the lower ends of the fuel rods 32 and 33 are guided in feedthroughs in a base plate within the fuel assembly box 30, in a manner not illustrated in FIG. 3. Furthermore, the lower ends of the fuel rods 32 are also bolted fast.

A corner bolt 37 stands on the upper side of the head plate 35, in one corner of the fuel assembly box 30. The corner bolt 37 has a longitudinal axis which is parallel to the longitudinal direction of the fuel assembly box 30 and the longitudinal axis of the fuel rods 32 and 33. The transverse or cross piece 31 which is located inside in a corner of the fuel assembly box 30, rests on the upper end of the corner bolt 37. The apex piece 40 of the angular part 2 rests on the outside of this transverse piece 31 in such a manner that the fuel assembly box 30 is fitted without play with its edge between the walls 5 and 6 of the angular part 2 and in particular in the L-shaped profile 7.

The screw bolt 14 extends through a feedthrough in the transverse piece or cross bar 31 and the thread 21 is threaded to a tapped hole in the corner bolt 37.

A bracket-type handle 38 is furthermore disposed on the head plate 35 for the gripper of a fuel assembly loading machine.

As is also described on German Published, Non-Prosecuted Application DE-OS No. 28 24 265 and DE-OS No. 30 27 562, corresponding to U.S. Pat. Nos. 4,304,635 and 4,448,744, respectively, four nuclear reactor fuel assemblies according to FIG. 3 are always disposed in a boiling-water nuclear reactor, in a square grid mesh of a transverse grid, which is the so-called upper core grid. Each of these four fuel assemblies is disposed in a corner of this mesh in such a way that the corners of the fuel assembly boxes 30 with the angular parts 2 are located in the center of the mesh and the two respective leaf springs 9 of laterally adjacent nuclear reactor fuel assemblies are braced against each other at that location. The fuel assembly boxes of the four nuclear reactor fuel assemblies contained in the same mesh of the core grid form a gap or slot-shaped intermediate space with a cross-shaped cross section, into which an elongated control rod which also has a cross-shaped cross section, is inserted from the lower ends of the four nuclear reactor fuel assemblies.

Expansion forces act on the screw bolt 14 in the longitudinal direction during loading and unloading of the four nuclear reactor fuel assemblies into or out of the mesh of the core grid. Those expansion forces which exceed a limit, can lead to a situation wherein the screw bolt 14 breaks at the expansion shank 23 which has a smaller diameter between the thread 21 and the screw head 15 and which is provided for this purpose. In this way, loose parts of the bolt cannot reach the gap-shaped space between the fuel assembly boxes, where they would interfere with the control rod. This is because the thread 21 remains screwed in the corner bolt 37, while the rest of the screw bolt 14 including the spring ring 18 remains held captive at the angular part 2 as before, due to the transverse pins 43 and the countersink 22 for the spring ring 18 forming a stop for the screw head 15.

The foregoing is a description corresponding in substance to German Application No. P 33 41 966.3, filed Nov. 21, 1983, the International priority of which is being claimed for the instant application and which is hereby made part of this application. Any material discrepancies between the foregoing specification and the aforementioned corresponding German application are to be resolved in favor of the latter.

I claim:

1. A nuclear reactor fuel assembly having fuel rods containing nuclear fuel, comprising a fuel assembly box in which the fuel rods are disposed, a head plate in said box having feedthroughs formed therein in which fuel rods are guided, at least some of the fuel rods being fastened to said head plate in said feedthroughs, a corner bolt disposed on top of said head plate, a cross piece disposed on said corner bolt at an angle inside corner of said box, an angular part disposed on two outer surfaces of said box above said corner bolt, said angular part having a shoulder, two leaf springs each extended in longitudinal direction of said box on a respective one of said two outer surfaces, a screw bolt connecting said box and said angular part to said corner bolt, said screw bolt having an expansion shank formed therein with a reduced diameter at said corner bolt, said screw bolt having a screw head with two ends, said screw head having a lower surface being supported on said shoulder of said angular part, said screw head having a constriction formed therein between said ends thereof defining a coaxial screw head shank with a reduced diameter disposed in a hole formed in said angular part above said shoulder, and a holding body in the form of a transverse pin fastened to said angular part in said hole and engaging said screw bolt at said constriction for connecting said screw bolt to the top of said angular part and preventing movement of said screw head relative to said angular part.

2. A nuclear fuel assembly according to claim 1, including a spring ring partially disposed in a countersink formed in said angular part and partially disposed between said screw head and said angular part.

3. A nuclear reactor fuel assembly according to claim 1, wherein said constriction in said screw head is spaced from both of said ends thereof.

* * * * *